D. I. GARRETSON.
TOOL HANDLE.
APPLICATION FILED APR. 16, 1913.
1,114,249.
Patented Oct. 20, 1914.
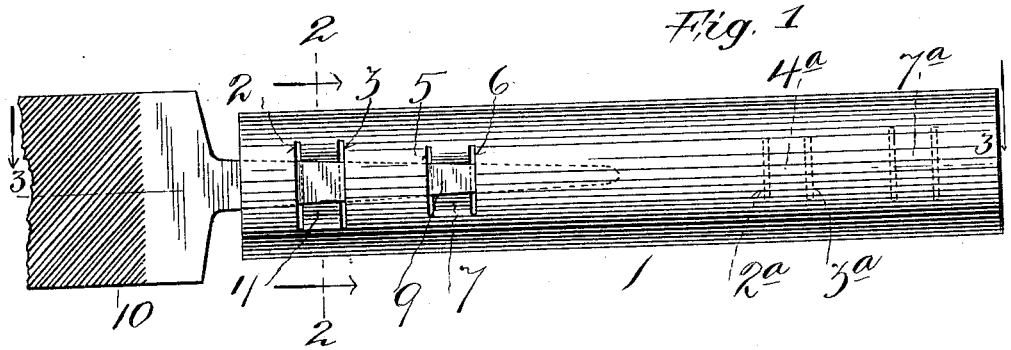
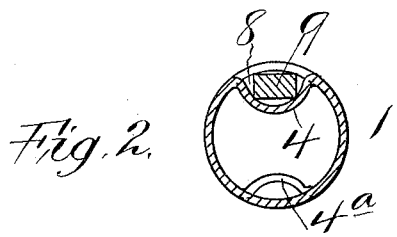
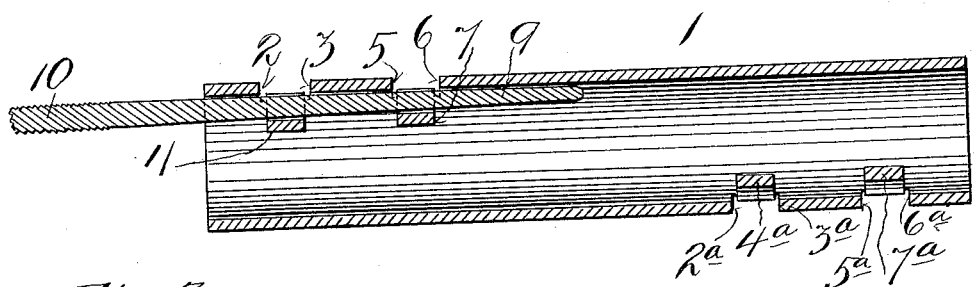
Witnesses:
A. B. Dollard
J. C. Druckliel
Inventor
David I. Garretson
By his Attorney
Charles G. Hensley

UNITED STATES PATENT OFFICE.

DAVID I. GARRETSON, OF NEW YORK, N. Y.

TOOL-HANDLE.

1,114,249.   Specification of Letters Patent.   Patented Oct. 20, 1914.

Application filed April 16, 1913. Serial No. 761,428.

*To all whom it may concern:*

Be it known that I, DAVID I. GARRETSON, a citizen of the United States, and a resident of the borough of Brooklyn, city of New York, county of Kings, and State of New York, have invented a certain new and useful Tool-Handle, of which the following is a specification.

The present invention relates to handles for tools, especially for files and similar tools having a shank adapted to be driven into a suitable handle.

The object of my invention is to provide a very convenient and smooth handle with a comfortable grip, which will be much stronger and more durable than ordinary wooden handles, and which may be made cheaply.

The present device may be made of commercial metal, such as ordinary tubing or pipe, with the use of commercial machinery such as may be found in almost any well equipped machine shop. That is to say, the present device may be inexpensively made without special tools and machinery. This is true regardless of the number of different sized handles necessary for different sized tools. By simply using tubes or pipes of different diameters and varying the lengths of the slots hereinafter referred to, handles of different sizes may be made without using special tools or machinery in their manufacture.

In the drawings forming part of this application, Figure 1 is an elevation, showing my invention in the preferred form, Fig. 2 is a cross section thereof, taken on the line 2—2 of Fig. 1, and Fig. 3 is a longitudinal section, taken on the line 3—3 of Fig. 1.

The handle comprises a tubular body, preferably cylindrical, formed of a piece of tubing or pipe of suitable length. In the drawing I have shown the handle formed of cylindrical tubing 1, such as may be procured of any metal dealer. The diameter of the tubing will depend partly upon the character of the tool on which the handle is to be used. A large heavy file for instance, would require a much larger handle than a small one; and one of the principal advantages of my present invention is, that different sized handles may be made without special machinery, by simply using tubings of different diameters.

The tube 1, cut to the desired length, is provided near one end with parallel slots 2, 3, extending crosswise of the tube; which form an intermediate strap 4, free along its side edges, but connected at its ends with the tube. Other slots or cuts 5, 6, are made crosswise of the tube, preferably parallel with each other and with the slots 2, 3. The slots 5, 6 form an intermediate strap 7 similar to the strap 4. Where the tool to be held in the handle has a tapered end like the one shown in the drawing, I prefer to make the slots 5, 6 shorter than the strap 4. Either simultaneously with the cutting of the several slots 2, 3, 5, 6, or thereafter, the straps are forced inwardly toward the middle of the tube, as shown at 8, so that the straps, when the handle is viewed from the end, will appear curved inwardly away from the wall of the tube, leaving an intermediate space 8, into which the end 9, of a tool 10 may be driven. When the tool is driven between the straps and the wall of the tube, the straps will be slightly forced, until a very tight grip on the tool shank is obtained; and the tool and handle will be firmly secured together regardless of the particular cross section of the shank. If desired, other slots $2^a$, $3^a$, $5^a$, $6^a$, may be formed near the other end and on the opposite side of the tube, as shown in Fig. 3. These slots form other straps $4^a$, $7^a$, similar to the straps 4, 7 and they are also bent inwardly toward the middle of the tube. A second tool may be driven in between these straps $4^a$, $7^a$ and the tube; and the single handle may thus be used for two oppositely extending tools, if desired.

It is obvious that different sized tubing will be used for making handles for large heavy tools than for smaller and lighter ones, but the material is always purchasable in suitable sizes in the open market, so that it is unnecessary either to employ special tools for making the handles, or to make castings, or to perform any part of the work on a lathe. The tubing may be severed into proper lengths and the several slots may all be cut at the same time, by a gang saw. The device is therefore inexpensive to manufacture and may be easily made in all necessary sizes.

The tube may be very thin metal; and I find that hollow or tubular metal makes the most efficient and strongest handle with a minimum of metal.

As the shank of the tool is held inside the tube, the handle may be gripped close up to the tool, if desired, and, since the end of the shank is contained within the tube, it is protected by the latter so that the hand will not be injured by the end of the shank in case it should slip.

Having described my invention, what I claim is:

1. A device of the character described, comprising a tubular body forming a tool handle having slots therein forming intermediate straps, said straps being bent inwardly toward the middle of the tubular body, whereby the straps and wall of the body will cooperate to hold a tool in the body.

2. A device of the character described, comprising a tubular body forming a tool handle having slots extending crosswise of the body and forming a plurality of substantially parallel, integral straps extending crosswise of said body and connected therewith at both ends of the straps, said straps being bent inwardly, whereby a tool entered between the straps and body will be held thereby, with the end of the tool contained in said body.

Signed at the city, county and State of New York, this 15th day of April, 1913.

DAVID I. GARRETSON.

Witnesses:
Wm. H. Drake,
A. B. Dollard.

Copies of this patent may be obtained for five cents each, by addressing the "Commissioner of Patents, Washington, D. C."